US010715769B2

(12) United States Patent
Aizaki et al.

(10) Patent No.: US 10,715,769 B2
(45) Date of Patent: Jul. 14, 2020

(54) PROJECTOR

(71) Applicant: JVC KENWOOD CORPORATION, Yokohama-shi, Kanagawa (JP)

(72) Inventors: Takatsugu Aizaki, Yokohama (JP); Shinji Kikuma, Yokohama (JP); Yasuki Arihara, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/381,418

(22) Filed: Apr. 11, 2019

(65) Prior Publication Data

US 2019/0394432 A1    Dec. 26, 2019

(30) Foreign Application Priority Data

Jun. 20, 2018 (JP) .................................. 2018-116862

(51) Int. Cl.
*H04N 9/31* (2006.01)
*G02B 1/11* (2015.01)
*G03B 21/20* (2006.01)

(52) U.S. Cl.
CPC .............. *H04N 9/3167* (2013.01); *G02B 1/11* (2013.01); *G03B 21/2006* (2013.01)

(58) Field of Classification Search
CPC ....... H04N 9/3167; G02B 1/11; G03B 21/006
USPC ......................................................... 353/20
See application file for complete search history.

(56) References Cited

U.S. PATENT DOCUMENTS

| 7,201,483 B2* | 4/2007 | Chung ................. H04N 9/3155 348/122 |
| 2004/0184007 A1* | 9/2004 | Silverstein ............. G02B 13/22 353/20 |
| 2005/0248734 A1 | 3/2005 | Chung et al. |
| 2008/0174742 A1 | 7/2008 | Ito |
| 2018/0292742 A1* | 10/2018 | Miura .................. G02B 26/008 |

FOREIGN PATENT DOCUMENTS

JP    2013-524662 A    6/2013

OTHER PUBLICATIONS

Extended European Search Report dated Oct. 21, 2019 corresponding to Application No. 19177135.1-1022.

* cited by examiner

*Primary Examiner* — Jerry L Brooks
(74) *Attorney, Agent, or Firm* — Nath, Goldberg & Meyer; Jerald L. Meyer

(57) ABSTRACT

A first image display element modulates first illumination light in which red illumination light and infrared illumination light are alternately switched, based on an image signal for visible light image and an image signal for infrared light image, and emits first image light in which red image light and infrared image light are alternately switched. A second image display element modulates green illumination light based on a green image signal, and emits green image light. A third image display element modulates blue illumination light based on a blue image signal, and emits blue image light. A synthesizer synthesizes the first image light, the green image light, and the blue image light with one another, and obtains synthesized image light. A projection unit projects the synthesized image light.

5 Claims, 3 Drawing Sheets

● : s-POLARIZED LIGHT
⟷ : p-POLARIZED LIGHT

PROJECTOR

CROSS REFERENCE TO RELATED APPLICATION

This application is based upon and claims the benefit of priority under 35 U.S.C. § 119 from Japanese Patent Application No. 2018-116862 filed on Jun. 20, 2018, the entire contents of which are incorporated herein by reference.

BACKGROUND

The present disclosure relates to a projector capable of displaying both of a visible light image and an infrared light image.

During the pilot training of an airplane or a helicopter, not only the actual flying training but also training by a training simulator system capable of reproducing a variety of scenes is effective.

Particularly, in a night flight of the helicopter or the like, in some cases, one of a main pilot and a copilot steers the helicopter by the naked eye, and the other steers the helicopter while wearing night vision goggles. Therefore, as the training simulator system, a system that displays a visible light image and an infrared light image on a screen is developed. Japanese Translation of PCT International Application Publication No. 2013-524662 describes a projector that projects both a visible light image and an infrared light image on the same display device.

SUMMARY

It is difficult to optimize characteristics of optical components of a projector in an entire band from a visible light band (450 nm to 650 nm) to an infrared light band (700 nm or more). Accordingly, in the projector capable of displaying both of the visible light image and the infrared light image, there have been problems of performance degradation such as a brightness decrease of a display image or of durability degradation of optical components due to heat generation in comparison with a projector that displays only the visible light image.

An aspect of one or more embodiments provides a projector including: a first image display element configured to modulate first illumination light in which red illumination light and infrared illumination light are alternately switched, based on an image signal for a visible light image and an image signal for an infrared light image, respectively, and to emit first image light in which red image light and infrared image light are alternately switched; a second image display element configured to modulate green illumination light based on a green image signal, and to emit green image light, a third image display element configured to modulate blue illumination light based on a blue image signal, and to emit blue image light; a synthesizer configured to synthesize the first image light, the green image light, and the blue image light with one another, and to obtain synthesized image light; and a projection unit configured to project the synthesized image light.

DETAILED DESCRIPTION

[Configuration]

Figure 1:
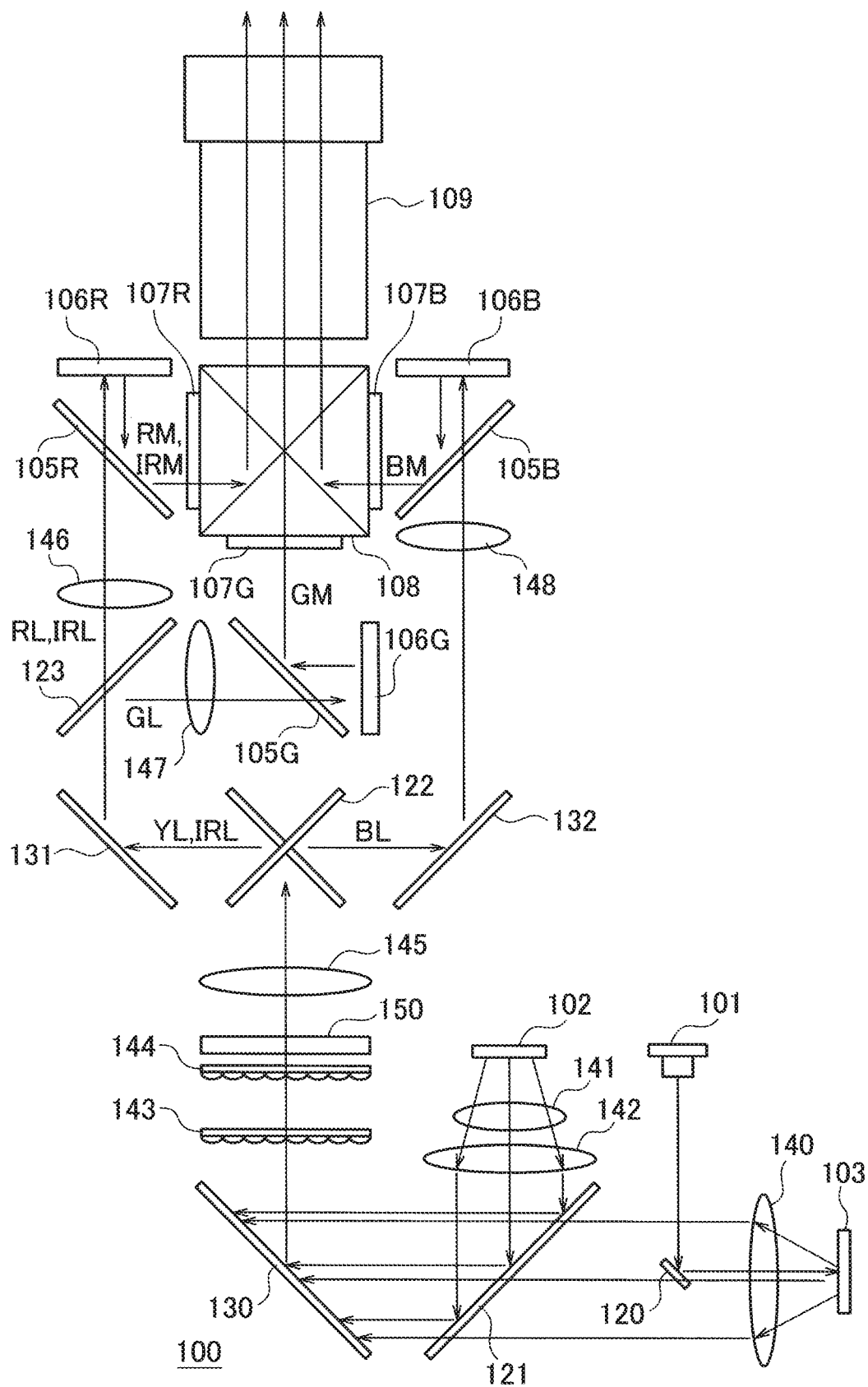
FIG. 1 is a configuration diagram illustrating an example of a projector according to one or more embodiments.

A configuration example of a projector according to one or more embodiments will be described with reference to FIG. 1. A projector 100 includes a light source 101, a light source 102, a phosphor 103, polarizing plates 105R, 105G, and 105B, image display elements 106R, 106G, and 106B, polarizing plates 107R, 107G, and 107B, a color synthesis prism 108, a projection lens 109, dichroic mirrors 120 to 123, reflection mirrors 130 to 132, lenses 140 to 148, and a polarization conversion element 150.

The dichroic mirrors 120 to 123 have characteristics to separate light, which has entered the same, by reflection and penetration while taking a separation wavelength as a separation boundary. Each of the dichroic mirrors 120 to 123 can be fabricated by forming a dielectric multilayered film on a predetermined region of a transparent material such as a glass plate and a prism, for example. Optical characteristics can be set in response to a material and film thickness of a dielectric that composes the dielectric multilayered film.

The light source 101 is a blue laser light source (blue light source) composed of a blue laser element, for example. The light source 101 emits blue laser light. Hereinafter, the blue laser light will be referred to as blue illumination light. The blue illumination light is irradiated on the dichroic mirror 120. The dichroic mirror 120 has characteristics to reflect the blue illumination light, and to allow penetration of yellow illumination light.

The blue illumination light emitted from the light source 101 is reflected by the dichroic mirror 120, and further, is condensed by the lens 140 and irradiated on the phosphor 103.

The phosphor 103 has a phosphor layer and a reflecting surface. The phosphor layer generates yellow illumination light including a component of a red band and a component of a green band, both of the components having intensities corresponding to an energy intensity of the irradiated blue illumination light from the light source 101. The reflecting surface reflects the blue illumination light that has penetrated the phosphor layer and reflects the yellow illumination light generated by the phosphor layer.

The yellow illumination light that is fluorescence generated by the phosphor 103 is irradiated toward the dichroic mirror 120 via the lens 140. The yellow illumination light penetrates the dichroic mirror 120 and is irradiated on the dichroic mirror 121.

The blue illumination light reflected by the phosphor 103 is irradiated toward the dichroic mirror 120 via the lens 140. A surface area of the dichroic mirror 120 is set to a size a little larger than a luminous flux of the blue laser light irradiated from the light source 101. Meanwhile, since the blue illumination light reflected by the phosphor 103 is diffused at the time of being reflected, a luminous flux of the blue illumination light irradiated from the lens 140 to the dichroic mirror 120 spreads sufficiently largely with respect to the area of the dichroic mirror 120. That is, with regard to the blue illumination light irradiated from the lens 140 to the dichroic mirror 120, a major part thereof is irradiated on the dichroic mirror 121 though a part thereof is reflected by the dichroic mirror 120.

The light source 102 is an infrared LED light source (infrared light source) composed of a near infrared LED element, for example. The light source 102 emits infrared LED light. Hereinafter, the infrared LED light will be referred to as infrared illumination light. The infrared illumination light is irradiated on the dichroic mirror 121 via the lenses 141 and 142. The dichroic mirror 121 has characteristics to reflect the infrared illumination light, and to allow penetration of the yellow illumination light and the blue illumination light. Hence, the dichroic mirror 121 synthesizes the blue illumination light, the yellow illumination light, and the infrared illumination light with one another.

The blue illumination light and the yellow illumination light, which have penetrated the dichroic mirror 121, and the infrared illumination light reflected by the dichroic mirror 121 are further reflected by the reflection mirror 130, and enter the lens 143.

For example, the lenses 143 and 144 are fly-eye lenses. The blue illumination light, the yellow illumination light, and the infrared illumination light, which have reflected on the reflection mirror 130, are uniformed in terms of illumination distribution by the lenses 143 and 144, and are caused to enter the polarization conversion element 150.

Figure 2:
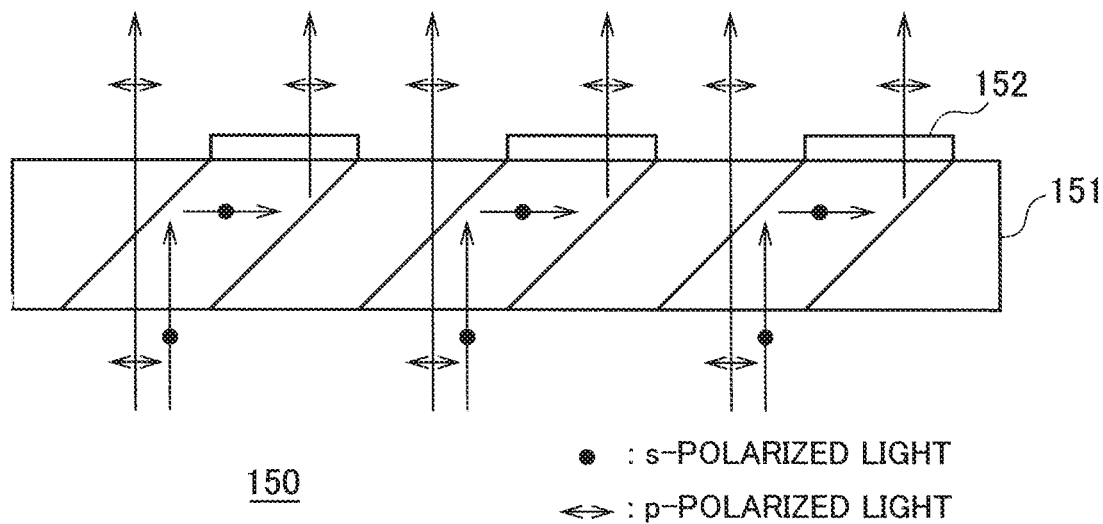
FIG. 2 is a configuration diagram showing an example of a polarization conversion element.

FIG. 2 shows a configuration example of the polarization conversion element 150. The polarization conversion element 150 includes a polarization beam splitter 151 and phase difference plates 152. The polarization beam splitter 151 reflects either one of s-polarized light and p-polarized light, and allows penetration of the other. FIG. 2 shows a state where the polarization beam splitter 151 reflects the s-polarized light and allows penetration of the p-polarized light.

The phase difference plates 152 convert either one of the s-polarized light and the p-polarized light into the other. FIG. 2 shows a state where the phase difference plates 152 convert the s-polarized light into the p-polarized light. The phase difference plates 152 are $\lambda/2$ phase difference plates, for example. $\lambda$ is a wavelength. Pieces of the illumination light are aligned to the p-polarized light by the polarization conversion element 150.

Returning to FIG. 1, by the polarization conversion element 150, the pieces of the illumination light, which are aligned to the p-polarized light, are irradiated on the dichroic mirror 122 via the lens 145. The lens 145 is a condenser lens, for example.

The cross dichroic mirror 122 separates blue illumination light BL and (yellow illumination light YL and infrared illumination light IRL), which have entered the same. The yellow illumination light YL and the Infrared illumination light IRL, which are thus separated by the dichroic mirror 122, reflect on the reflection mirror 131, and enter the dichroic mirror 123.

The dichroic mirror 123 takes an intermediate wavelength between the red light band and the green light band as a separation boundary, and separates the received yellow illumination light YL and infrared illumination light IRL into (red illumination light RL containing a component of the red band and the infrared illumination light IRL) and (green illumination light GL containing a component of the green band). Specifically, the dichroic mirror 123 reflects a green band component, in the received yellow illumination light YL, and emits the green illumination light therein, and allows penetration of a red band component, in the received yellow illumination light YL, and emits the red illumination light RL therein. Moreover, the dichroic mirror 123 allows penetration of the infrared illumination light IRL.

The red illumination light RL and the infrared illumination light IRL, which are separated by the dichroic mirror 123, are irradiated on the polarizing plate 105R via the lens 146. The green illumination light GL separated by the dichroic mirror 123 is irradiated on the polarizing plate 105G via the lens 147. The blue illumination light BL separated by the dichroic mirror 122 reflects on the reflection mirror 132, and is irradiated on the polarizing plate 105B via the lens 148.

The polarizing plates 105R, 105G, and 105B have characteristics to reflect either one of the s-polarized light and the p-polarized light, and to allow penetration of the other. FIG. 1 shows a state where the polarizing plates 105R, 105G, and 105B reflect the s-polarized light and allows the penetration of the p-polarized light. The polarizing plates 105R, 105G, and 105B are also referred to as reflection-type polarization plates. The polarizing plates 105R, 105G and, 105B are wire grid polarizing plates, for example.

The red illumination light RL and the infrared illumination light IRL, which are the p-polarized light, penetrate the polarizing plate 105R, and are irradiated on the image display element 106R. The green illumination light GL, that is the p-polarized light, penetrate the polarizing plate 105G and is irradiated on the image display element 106G. The blue illumination light BL that is the p-polarized light penetrate the polarizing plate 105B and is irradiated on the image display element 106B.

The image display elements 106R, 106G, and 106B are reflective liquid crystal display elements, for example. One or more embodiments are described by taking as an example a case where the image display elements 106R, 106G, and 106B are the reflective liquid crystal display elements; however, the image display elements are not limited to the reflective type, and a configuration of using transmissive liquid crystal display elements may be adopted. Moreover, one or more embodiments are applicable to not only the liquid crystal display elements but also to a variety of configurations of using other display elements.

The image display element 106R optically modulates the p-polarized red illumination light RL, based on the image data of the red light component, and generates s-polarized red image light RM. Moreover, the image display element 106R optically modulates the p-polarized infrared illumination light IRL, based on the image data of the red light component, and generates s-polarized infrared image light IRM. The red image light RM and the infrared image light IRM are collectively referred to as first image light.

The image display element 106G optically modulates the p-polarized green illumination light GL, based on the image data of the green light component, and generates s-polarized green image light GM. The image display element 106B optically modulates the p-polarized blue illumination light BL, based on the image data of the blue light component, and generates s-polarized blue image light BM. That is, the image display element 106R functions as an optical modulator for the red image and an optical modulator for the infrared light image, the image display element 106G functions as an optical modulator for the green image, and the image display element 106B functions as an optical modulator for the blue image.

The polarizing plates 107R, 107G, and 107B have characteristics to allow the penetration of either one of the s-polarized light and the p-polarized light, and to reflect or absorb the other. FIG. 1 shows a state where the polarizing plates 107R, 107G, and 107B allow penetration of the s-polarized light, and to absorb the unnecessary p-polarized light. The polarizing plates 107R, 107G, and 107B are also referred to as transmission-type polarizing plates.

In a display of the infrared light image, it is required that the infrared image light be irradiated with a high illumination intensity. Therefore, optical components on an optical path on the infrared illumination light IRL or the infrared image light IRM are likely to generate heat in comparison with optical components provided on optical paths of the illumination light and image light of the other colors. Therefore, for the polarizing plate 107R that serves as the optical path for the infrared image light IRM, a wire grid polarizing plate having high heat resistance and good characteristics in a wide band is used. In this way, reliability and performance can be improved in comparison with a case of using a typical resin-made polarizing plate. Meanwhile, the wire grid polarizing plate is more expensive than the typical resin-made polarizing plate, and accordingly, for each of the polarizing plates 107G and 107B which are not located on the optical path of the infrared image light IRM, the typical resin-made polarizing plate only needs to be used.

The red image light RM and the infrared image light IRM, which are the s-polarized light, and are generated by the image display element 106R reflect on the polarizing plate 105R, penetrate the polarizing plate 107R, and are irradiated on the color synthesis prism 108. The green image light GM, that is the s-polarized light and is generated by the image display element 106G, reflects on the polarizing plate 105G, penetrate the polarizing plate 107G, and is irradiated on the color synthesis prism 108. The blue image light BM that is the s-polarized light and is generated by the image display element 106B, reflects on the polarizing plate 105B, penetrates the polarizing plate 107B, and is irradiated on the color synthesis prism 108.

The color synthesis prism 108 reflects the red image light RM, the infrared image light IRM, and the blue image light BM, allows the penetration of the green image light GM, and irradiated these respective pieces of image light on the projection lens 109.

The red image light RM, the infrared image light IRM, the green image light GM, and the blue image light BM are projected via the projection lens 109 onto an unillustrated screen or the like. A visible light image is displayed by the red image light RM, the green image light GM, and the blue image light BM. An infrared light image is displayed by the infrared image light IRM.

The optical components on the optical paths of the illumination light and the image light are subjected to an appropriate anti-reflective coating, whereby efficiencies of the optical components can be improved to a large extent. In the anti-reflective coating, components to be coated, the number of coating film layers, and the like are designed in accordance with wavelength bands for use. Typically, as a wavelength band to which the anti-reflective coating adapts is becoming wider, the number of coating film layers is increased to increase cost. Moreover, as the wavelength band to which the anti-reflective coating adapts is becoming wider, a characteristic difference between a design simulation value and that of an actual object is increased, and therefore, the wavelength band is desirably narrower.

Figure 3:
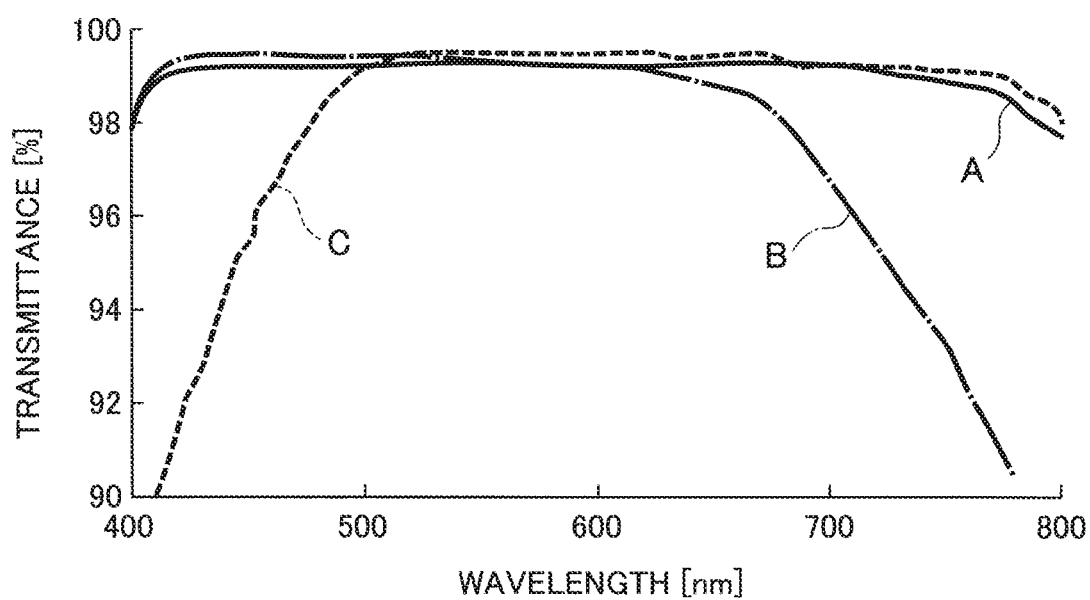
FIG. 3 is a view illustrating a characteristic example of an anti-reflective coating.

FIG. 3 shows a characteristic example of the anti-reflective coating. An axis of abscissas in FIG. 3 represents a wavelength of the light that enters the optical component subjected to the anti-reflective coating, and an axis of ordinates in FIG. 3 represents a transmittance of the light that enters the same. Symbol A in FIG. 3 indicates a characteristic example of a coating for a wide band. The coating for the wide band has good characteristics in a wavelength band as wide as 450 nm to 800 nm, the wavelength band including the visible light and the infrared light. The optical components located on the optical path of the entire light including the entire light of the visible light and the infrared light are subjected to the coating for the wide band. The optical components which are shown in FIG. 1 and are located on an optical path from the dichroic mirror 121 to the dichroic mirror 122 are targets of the coating for the wide band.

Symbol B indicates characteristics of a coating for a short wavelength. The coating for a short wavelength has good characteristics in a short wavelength band (450 nm to 650 nm); however, a transmittance thereof gradually decreases in a wavelength of 650 nm or more. The optical components which are not located on the optical path of the infrared light are subjected to the coating for a short wavelength. The lens 140, the dichroic mirror 120, the optical components which are located on the optical path from the reflection mirror 132 to the polarizing plate 107B, and the optical components which are located on the optical path from the lens 147 to the polarizing plate 107G, shown in FIG. 1, are targets of the coating for a short wavelength.

Symbol C indicates characteristics of a coating for a long wavelength. The coating for long wavelength has good characteristics in a long wavelength band (500 nm to 800 nm); however, a transmittance thereof gradually decreases in a wavelength of 500 nm or less. The optical components located on the optical path of only the red light and the infrared light are subjected to the coating for long wavelength. The lenses 141 and 142, and the optical components which are located on the optical path from the lens 146 to the polarizing plate 107R, shown in FIG. 1, are targets of the long wavelength coating. Note that different characteristics of the transmittance are equivalent to different anti-reflection characteristics.

As described above, the anti-reflective coating corresponding to the wavelength band of the light to be processed is implemented, whereby good characteristics can be obtained without too much cost.

[Signal Processing]

Figure 4:
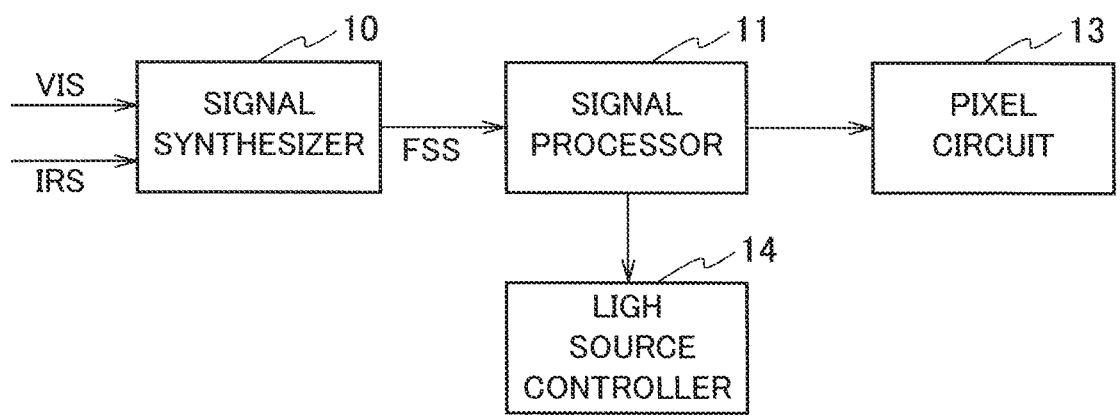
FIG. 4 is a block diagram illustrating a configuration example of a drive circuit that drives image display elements.

An example of signal processing in the projector according to one or more embodiments will be described with reference to FIGS. 4 and 5. FIG. 4 is a block diagram showing a configuration example of a drive circuit 200 that drives the image display elements 106R, 106G, and 106B. The drive circuit 200 includes a signal synthesizer 10, a signal processor 11, a pixel circuit 13, and a light source controller 14.

The signal synthesizer 10 synthesizes an image signal for a visible light image VIS and an image signal for an infrared light image IRS, which are input thereto, with each other, and generates a frame sequential signal FSS. Symbol S1 in FIG. 5 indicates the image signal for the visible light image VIS, and Symbol S2 in FIG. 5 indicates the image signal for the infrared light image IRS. As an example, Symbols S1 and S2 show a case where frame rates of both of the image signal for the visible light image VIS and the image signal for the infrared light image IRS are 60 Hz. Display speeds the image signal for the visible light image VIS and the image signal for the infrared light image IRS are individually doubled, and both thereof are alternately rearranged to be converted into the frame sequential signal FSS with a frame rate of 120 Hz as shown in Symbol S3.

Figure 5:
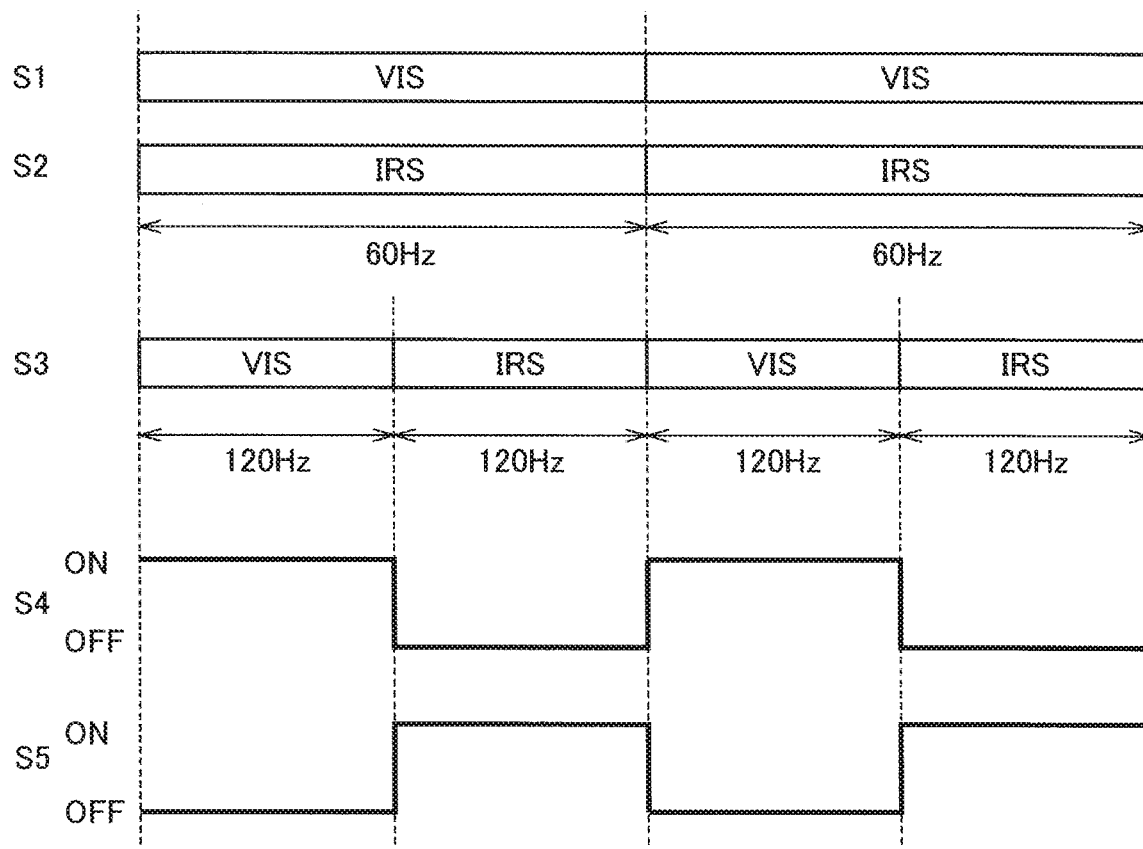
FIG. 5 is a timing chart illustrating an example of signal processing.

The example shown in FIG. 5 shows a state where the image signal for the visible light image VIS and the image signal for the infrared light image IRS, which are input to the signal processor 11, are input at 60 Hz; however, frequencies of such input signals are not limited to 60 Hz, and may be other frequencies (for example, 50 Hz or 24 Hz). The signal processor 11 converts the image signals to the signals with the doubled frequency; however, a multiple in converting the frequency is not limited to double, and may be more than double or may be unchanged.

Returning to FIG. 4, the signal processor 11 determines gradations of the respective pixels based on the frame sequential signal FSS, and sends gradation data thus determined to the pixel circuit 13. The pixel circuit 13 drives the image display elements 106R, 106G, and 106B based on the received gradation data.

Moreover, the signal processor 11 generates a light source control signal synchronized with the frame sequential signal FSS, and sends the generated light source control signal to the light source controller 14. The light source controller 14 switches on and off of each of the light source 101 and the light source 102, based on the light source control signal. Symbol S4 in FIG. 5 indicates an on/off state of the light source 101, and Symbol S5 indicates an on/off state of the light source 102. The light source 101 and the light source 102 are controlled to alternately turn on and off in response to periods of the image signal for the visible light image VIS and the image signal for the infrared light image IRS.

The image display element 106R optically modulates the red illumination light RL and the infrared illumination light IRL alternately with each other, and generates the red image light RM and the infrared image light IRM. The image display element 106G optically modulates the green illumination light GL and generates the green image light GM. The image display element 106B optically modulates the blue illumination light BL and generates the blue image light BM.

As described with reference to FIG. 1, the red image light RM, the green image light GM, and the blue image light BM are synthesized with one another by the color synthesis prism 108, and are projected onto an unillustrated screen or the like by the projection lens 109, whereby a visible light image is displayed. The infrared image light IRM is projected via the color synthesis prism 108 to the unillustrated screen or the like by the projection lens 109, whereby an infrared light image is displayed. Hence, the visible light image and the infrared light image are alternately displayed on the screen.

A method for driving the image display elements may be of the analog method of controlling driving voltage values of pixels, or may be of the digital method of dividing a frame into a plurality of subframes, combining subframes in which applied voltages are turned on, and subframes in which applied voltages are turned off, and performing gradation display.

As described above, the projector 100 is configured to separate the optical paths of the red and infrared illumination light, the green illumination light, and the blue illumination light from one another, and can thereby reduce thermal loads of the optical components located on the respective optical paths. Moreover, the projector 100 separates the optical paths of the red and infrared illumination light, the green illumination light, and the blue illumination light from one another, and can thereby optimize the characteristics of the optical components located on the respective optical paths.

Therefore, there can be provided a projector in which the performance degradation such as a brightness decrease of the display image and the durability degradation are less in comparison with the projector that displays only the visible light image, the projector being capable of displaying both of the visible light image and the infrared light image.

Furthermore, components having high heat resistance are used for the components located on the optical path of the infrared light, which are particularly likely to generate heat, whereby the degradation of the durability of the optical components due to heat generation can be suppressed. Moreover, the projector 100 is configured using as a base a three plate-type visible light projector, and has a configuration of processing the infrared light using the optical path for the red light. Accordingly, the projector 100 can display both of the visible light image and the infrared light image without changing an optical system of the conventional three plate-type visible light projector.

In one or more embodiments, a description has been given of the configuration of generating the yellow illumination light YL and the blue illumination light BL using the light source 101 that is a blue laser light source and the phosphor 103 and synthesizing therewith the infrared illumination light IRL emitted from the light source 102 that is the infrared LED light source; however, one or more embodiments are not limited to this configuration. For example, for each of the light source 101 and the light source 102, a laser light source, an LED light source, or a lamp light source may be appropriately selected and used.

Note that the present invention is not limited to one or more embodiments described above, and is modifiable in various ways within the scope without departing from the scope of the present invention.

What is claimed is:
1. A projector comprising:
a blue light source configured to emit blue illumination light; and
an infrared light source configured to emit infrared illumination light;
a light source controller configured to switch on and off of each of the blue light source and the infrared light source in such a way that the blue light source and the infrared light source are alternately turned on and off;
a phosphor configured to convert a part of the blue illumination light into yellow illumination light;
a first dichroic mirror configured to synthesize the blue illumination light, the yellow illumination light, and the infrared illumination light with one another;
a second dichroic mirror configured to separate the blue illumination light from a synthesized illumination light in which the blue illumination light and illumination light of a color other than blue are synthesized;
a third dichroic mirror configured to separate the yellow illumination light and the infrared illumination light into red illumination light, the infrared illumination light, and green illumination light;
a first image display element configured to modulate first illumination light in which the red illumination light and the infrared illumination light are alternately switched, based on an image signal for a visible light image and an image signal for an infrared light image, respectively, and to emit first image light in which red image light and infrared image light are alternately switched;
a second image display element configured to modulate the green illumination light based on a green image signal, and to emit green image light,
a third image display element configured to modulate the blue illumination light based on a blue image signal, and to emit blue image light;

a synthesizer configured to synthesize the first image light, the green image light, and the blue image light with one another, and to obtain synthesized image light; and a projection unit configured to project the synthesized image light.

2. The projector according to claim 1, further comprising a first transmission-type polarizing plate, provided on an optical path of the first image light, configured to allow penetration of first polarized light of the first image light, and to absorb or reflect second polarized light of the first image light;

a second transmission-type polarizing plate, provided on an optical path of the green image light, configured to allow penetration of first polarized light of the green image light, and to absorb or reflect second polarized light of the green image light; and a third transmission-type polarizing plate, provided on an optical path of the blue image light, configured to allow penetration of first polarized light of the blue image light, and to absorb or reflect second polarized light of the blue image light;

wherein the first transmission-type polarizing plate has higher heat resistance than the second transmission-type polarizing plate or the third transmission-type polarizing plate.

3. The projector according to claim 2, wherein the first transmission-type polarizing plate is a wire grid polarizing plate, and the second transmission-type polarizing plate is a resin-made polarizing plate.

4. The projector according to claim 1, wherein an anti-reflective coating is implemented for an optical component located on the optical path of each of the first illumination light, the first image light, the green illumination light, the green image light, the blue illumination light, and the blue image light, the anti-reflective coating implemented for the optical component located on the optical path of the first illumination light or the first image light and the anti-reflective coating implemented for the optical component that is not located on the optical path of the first illumination light and the first image light have anti-reflective characteristics different from each other.

5. The projector according to claim 1, further comprising a fourth dichroic mirror configured to reflect the blue illumination light and to allow penetration of the yellow illumination light, wherein the phosphor further reflects a part of the blue illumination light, wherein the first dichroic mirror allows penetration of the blue illumination light and the yellow illumination light and reflects the infrared illumination light to synthesize the blue illumination light, the yellow illumination light, and the infrared illumination light with one another; and wherein the second dichroic mirror separates the blue illumination light, the yellow illumination light, and the infrared illumination light, which are synthesized with one another by the first dichroic mirror, into the blue illumination light, the yellow illumination light, and the infrared illumination light.

\* \* \* \* \*